Figure 1:
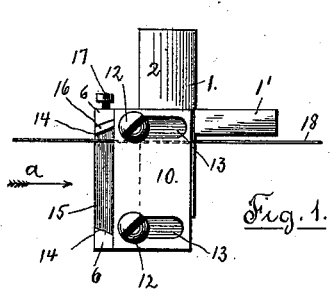

(No Model.)

S. MIDGLEY.
CUTTER FOR CARD SETTING MACHINES.

No. 414,815. Patented Nov. 12, 1889.

Witnesses
Chas. F. Schmelz.
C. S. Short

Inventor
Sam Midgley,
By his Attorney
John C. Dewey.

UNITED STATES PATENT OFFICE.

SAM MIDGLEY, OF LEICESTER, MASSACHUSETTS.

CUTTER FOR CARD-SETTING MACHINES.

SPECIFICATION forming part of Letters Patent No. 414,815, dated November 12, 1889.

Application filed August 22, 1889. Serial No. 321,576. (No model.)

*To all whom it may concern:*

Be it known that I, SAM MIDGLEY, a subject of the Queen of Great Britain, residing at Leicester, in the county of Worcester and State of Massachusetts, have invented certain new and useful Improvements in Cutters for Card-Setting Machines; and I do hereby declare that the following is a full, clear, and exact description thereof, which, in connection with the drawings making a part of this specification, will enable others skilled in the art to which my invention belongs to make and use the same.

My invention relates to cutters or cutting mechanism for card-setting machines; and the object of my invention is to improve upon the construction of the cutters or cutting mechanism now in general use in card-setting machines for cutting off the wire preparatory to its being bent and thrust through the card-clothing, and my improved cutter or cutting mechanism is especially adapted for cutting the hardened and tempered steel wire now generally used in the manufacture of card-clothing, and which is so hard as to quickly dull the edge of the old form of cutters.

My invention consists in certain novel features of construction and operation of a cutter or cutting mechanism for card-setting or other machines, as will be hereinafter fully described, and the nature thereof indicated by the claims.

It will be understood by those skilled in the art that in card-setting machines the wire which forms the teeth of the clothing is fed into the machine at regular intervals, and is then cut off in suitable lengths by the cutter preparatory to being operated upon by the other mechanisms of the machine. My invention relates simply to the cutter or cutting mechanism for cutting off the wire, which may be attached to and used in connection with any of the ordinary forms of card-setting machines.

In my cutting mechanism the cutter-blade is rigidly supported, and has a reciprocating motion back and forth at right angles to the movement of the wire to be cut, and is so supported and arranged that its cutting-edge may be adjusted up or down relatively to the position of the wire to be cut, so that the full width of the cutter or cutter-blade may be utilized as a cutting-edge, and as soon as a portion of the cutting-edge becomes dull or blunted a new cutting-edge may be presented to the wire, and this without resharpening the cutter or stopping the operation of the machine; and, further, I combine with the cutter-blade an adjustable plate, against the edge of which the cutter-blade shears or cuts off the wire, and as said plate becomes worn it can be adjusted with the cutter-blade relatively to the position of the wire, and when necessary it can be removed and reground and adjusted to the cutter-blade.

The cutter or cutter-blade of my cutting mechanism can be readily removed, when necessary, for sharpening. The cutter-blade is given a reciprocating motion in a horizontal plane by means of an arm or lever hinged to its rear part and connected with a cam on one of the shafts of the machine or in any other suitable manner.

Figure 2:
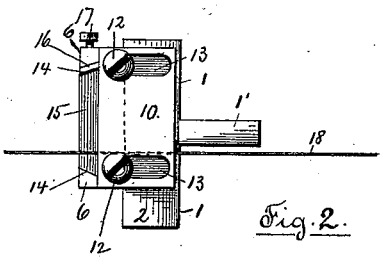
Figure 5:
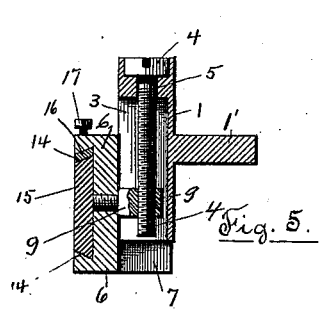
Figure 6:
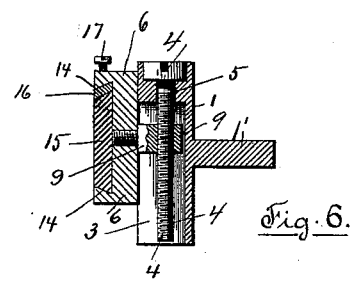
Figure 3:
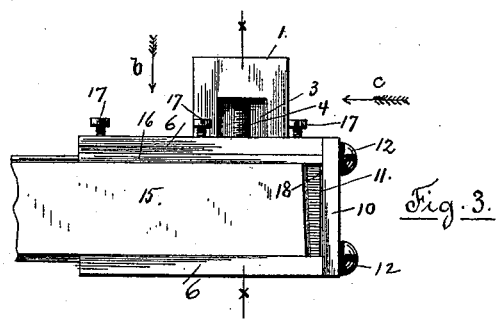
Figure 4:
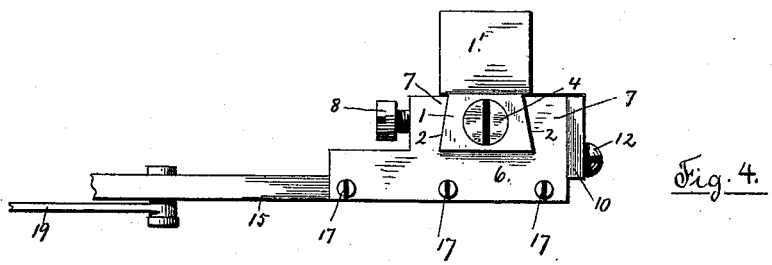

Referring to the drawings, Figure 1 represents a front end view of my improved cutting mechanism for card-setting machines, showing the cutter-blade and plate in their lowest position relatively to the wire to be cut. Fig. 2 corresponds to Fig. 1, except that the cutter-blade and plate are shown in their highest position, having been moved up from the position shown in Fig. 1, so as to utilize the full width of the same as cutting-edges. Fig. 3 is a side view of the cutting mechanism, looking in the direction of arrow *a*, Fig. 1. Fig. 4 is a plan view looking in the direction of arrow *b*, Fig. 3. Fig. 5 is a vertical cross-section on line *x x*, Fig. 3, looking in the direction of arrow *c*, same figure. Fig. 6 is a corresponding vertical cross-section, with the parts in the position shown in Fig. 2.

In the accompanying drawings, 1 is a block adapted to be secured to the machine upon which my cutting mechanism is applied, and preferably provided with a plate or extension 1', extending out therefrom to furnish means for securing said block to the machine. The block 1 has beveled sides 2, (see Fig. 4,) and has its central part cored out, as shown at 3, Fig. 5, and is provided with an adjusting-screw 4, which passes freely through a hole 5 in the upper part of said block 1. The head of said screw 4 fits in a cavity in the top of said block, which forms a bearing for said head as the screw is turned to raise or adjust the cutter-holder carrying the cutter and plate. The cutter-holder 6 is cut out at its rear part and provided with the beveled extensions 7, which are adapted to fit over and inclose the beveled sides 2 of the block 1, (see Fig. 4,) so that said cutter-holder may be moved up and down in a vertical plane on said block 1, as indicated in Figs. 1, 2, 5, and 6. A binding-screw 8 (see Fig. 4) extends through one of the extensions 7, and bears with its inner end against the outer surface of the block 1 to hold the cutter-holder 6 in position when adjusted.

From the rear part of the cutter-holder 6, between the extensions 7, extends a hub 9 (see Figs. 5 and 6) into the cored-out portion 3 of the block 1. Said hub 9 is provided with a screw-threaded hole, through which the adjusting-screw 4 passes, (see Figs. 5 and 6,) the thread on said screw being adapted to engage the thread in said hole. By loosening the binding-screw 8 and turning the screw 4 the cutter-holder 6, carrying the cutter and plate, is moved in a vertical plane on the block 1, the screw 4 remaining stationary and causing the hub projecting out from said holder 6 to be moved up or down on said screw within said cored-out portion 3 of the block 1 by the thread on the screw engaging the thread in the hub, all as will readily be understood by those skilled in the art.

The front end of the cutter-holder 6 is slightly depressed in its central part, as shown at 11, Fig. 3, about the depth of the diameter of the wire to be cut. A plate 10 extends over said depression 11, and is secured to the front end of the cutter-holder 6 by means of screws 12, extending through slots 13 in said plate. (See Figs. 1 and 2.) The inner edge of said plate 10 furnishes a surface, against which the wire bears as the cutter-blade cuts or shears off the wire. The plate 10 moves up or down with the cutter-blade relatively to the wire, and thus presents a new surface or position to the wire. When the edge of the plate 10 becomes worn it can be removed and ground and readily reset again by means of screws 12 and slots 13, so that its inner edge will always be flush with the cutter-blade. The front side of the cutter-blade holder 6 is provided with beveled grooves 14, into which the cutter-blade 15, with corresponding beveled edges, and preferably made of a piece of steel, fits and slides back and forth. By means of a gib 16, fitting into one of the beveled grooves 14, the cutter-blade 15 is retained in position, and the tension on the cutter-blade is regulated by means of screws 17, the inner ends of which bear on the gib 16 in the ordinary way. By means of the grooves 14 in the cutter-holder 6, in which the cutter-blade moves back and forth, the cutter is held perfectly stiff and rigid and its cutting-edge prevented from yielding or bending and getting out of position. The front or cutting edge of the cutter-blade is made slightly beveled (see Fig. 3) and shears off the wire 18, which extends in the depression 11 in the end of the cutter-holder 6 between the end of said holder and the plate 10, (see Fig. 3,) against the edge of said plate, which is flush with the cutting-edge of the cutter-blade 15. (See Figs. 1 and 2.) A reciprocating motion is given to the cutter-blade 15 to cause the same to slide back and forth in a horizontal plane in the grooves 14 of the cutter-holder 6 in any ordinary and well-known way. A lever or arm 19, Fig. 4, may be hinged to the rear end of the cutter-blade and connected with a cam on one of the shafts of the machine, through which a reciprocating motion is given to said lever and through the same to the cutter-blade.

From the above description the operation of my improved cutting mechanism will be readily understood by those skilled in the art, and is as follows: The wire 18 is inserted in the depression 11 in the end of the cutter-blade holder 6 between the end of said holder and the plate 10, secured thereon, and is held in its proper horizontal position by means of the wire-guide of the card-setting machine of ordinary construction, (not here shown,) it forming no part of my invention. The cutter-blade holder 6, carring the cutter-blade 15 and plate 10, is adjusted to its lowest position (in the manner hereinbefore described) relatively to the position of the wire, as shown in Fig. 1, and the top part of the cutting-edge of the cutter-blade 15 and plate 10 gradually moved upward on the block 1 until it reaches its highest position, as shown in Fig. 2, the position of the wire 18 remaining the same, and thus the full width of the cutter-blade is presented to the wire to act as a cutting-edge.

The advantages of my improved cutting mechanism will be apparent to those skilled in the art.

The hardened and tempered steel wire now generally used for card-clothing is very hard to cut, and the ordinary die and spring cutters are very soon dulled and require constant sharpening and readjustment and are totally inadequate for the work they have to do, and consequently cause frequent grinding and stopping of the machine.

The details of construction of my cutting mechanism may be varied somewhat without departing from the principle of my invention, which consists, essentially, in providing a wire-cutting mechanism with a reciprocating cutter or cutter-blade and plate, in which the position of the cutting-edges relatively to the wire to be cut may be adjusted without removing the cutter-blade or plate, so as to utilize the full width of the same as cutting-edges, and so as to present a new cutting-edge to cut the wire without resharpening.

Having thus described my invention, what I claim as new, and desire to secure by Letters Patent, is—

1. In a wire-cutting mechanism, the combination, with a stationary block, of a cutter-holder supported on said block and carrying a reciprocating cutter and plate, and means for adjusting the cutter-holder up or down on said block, so as to change the position of the cutting-edges of the cutter and plate relatively to the wire to be cut without removing the same, substantially as set forth.

2. In a wire-cutting mechanism, the combination, with a stationary block, of a cutter-holder supported on said block and carrying a reciprocating cutter and an adjustable plate on its front end, and means for adjusting the cutter-holder so as to change the position of the cutter and plate relatively to the wire to be cut and to present new cutting-edges, substantially as set forth.

SAM MIDGLEY.

Witnesses:
JOHN C. DEWEY,
CHARLES S. SHORT.